United States Patent Office 3,474,807
Patented Oct. 28, 1969

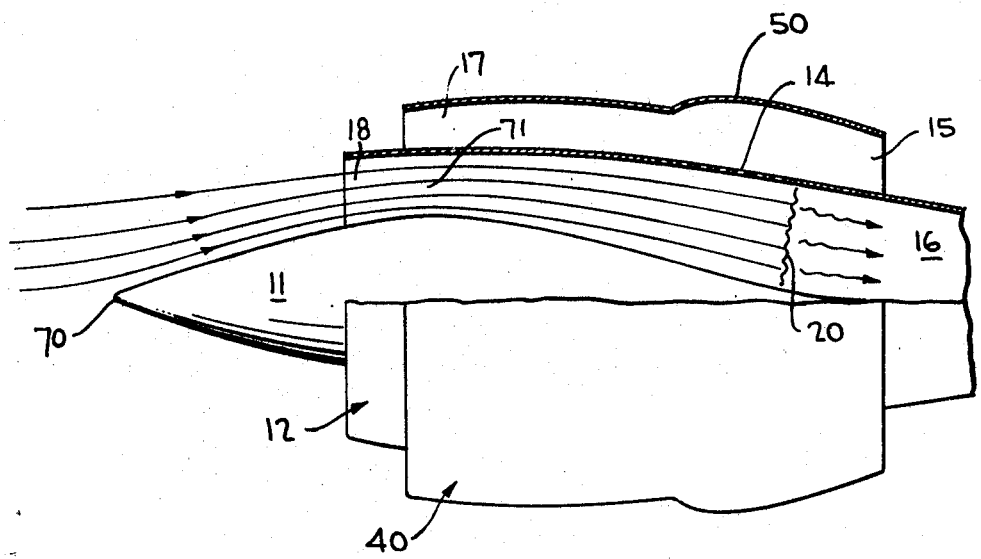

3,474,807
SELF-REGULATING SUPERSONIC AERODYNAMIC DIFFUSER
Allen B. Holmes, Rockville, Md., assignor to the United States of America as represented by the Secretary of the Army
Filed May 22, 1967, Ser. No. 641,439
Int. Cl. F02b 27/00; F02k 1/00
U.S. Cl. 137—15.1                                   3 Claims

ABSTRACT OF THE DISCLOSURE

Ram air is fed to a diffuser having a throat region. A series of bleed orifices are positioned within the diffuser downstream of the throat to control the back pressure in the diffuser and insure that the location of a normal shock wave in the diffuser will be downstream of the throat. The pressure external to the bleed orifices is maintained above atmospheric by means of air flow through a secondary passage, so that under optimum equilibrium operating conditions the pressure on both sides of the orifices is the same and there is no flow through them.

Background of the invention

This invention relates to means of controlling the position of a normal shock wave within a diffuser and in particular for means for controlling the position of a normal shock wave within a diffuser without utilizing any moving parts.

Maximum utilization of ram air approaching a diffuser can be achieved only if the proper relationships between shock wave locations within the diffuser are maintained. A serious loss of total pressure occurs when a supersonic stream of air is decreased in velocity to a subsonic velocity. Inasmuch as a normal shock wave will exist whenever a supersonic flow is reduced to subsonic velocities it is important that the strength of this wave be minimized. The strength or pressure rise across a shock wave is a function of the local free stream Mach number. With all supersonic diffusers the maximum compression efficiency or pressure recovery is attained when a normal shock occurs at the lowest possible Mach number. In a diffuser this condition is satisfied a short distance downstream from the throat of the diffuser. If the normal shock wave is allowed to enter the throat the flow will become unsteady and result in a complete expulsion of the shock wave which in turn causes a drastic reduction in the overall performance of the engine to which the ram air is fed.

Prior art devices for controlling the position of a normal shock wave within a diffuser utilize a series of back pressure bleeds. When a shock wave moved upstream to the throat, part of the flow was bled to atmosphere causing a reduction in back pressure and the normal shock was returned to its original position downstream of the throat. The bleeds were controlled by mechanically actuated devices and because of the high speed of propagation of the wave and slow response times of the mechanical devices, this concept has not been able to be completely utilized to successfully control the shock position within a diffuser.

It is therefore an object of the present invention to provide improved means to be utilized with a diffuser to control the position of a shock wave therein.

A further object of the present invention is to provide means to control the position of a shock wave within a diffuser, said means having a rapid response time and no moving mechanical parts.

Still a further object of the present invention is to provide means to control the position of a shock wave within a diffuser that are easy to make, require little or no maintenance, and response rapidly to wave propagations within the diffuser.

Summary of the invention

A self-regulating supersonic air diffuser of the type having a series of bleed orifices downstream of the throat region. A coaxial shroud surrounds the diffuser. Ram air flowing through the shroud produces a region of above-atmospheric pressure on the external side of the bleed orifices. Under normal equilibrium operating conditions the pressure on the internal side of the bleed orifices is the same as that on the external side, and there is no flow through the bleed orifices.

Brief description of the drawing

The figure is a schematic illustration of an embodiment in accordance with the present invention.

Description of the preferred embodiments

The drawing shows a diffuser comprising a center body 11 having a leading edge 70. Surrounding center body 11 is a first cowl 12 and a second cowl 40. Cowl 12 and center body 11 define a first inner passage 18 while between cowl 40 and cowl 12 is a second passage 17. Center body 11 is shaped to form a throat region 71, said throat region representing the smallest cross sectional area between center body 11 and cowl 12. Downstream of throat 71 and positioned on cowl 12 are a series of orifice bleeds 14. Passage 17, adjacent bleeds 14, has a slightly increased cross sectional area 50, and leads to a passage 15 which communicates with a low pressure sink such as atmosphere. Downstream of passage 18 and downstream of bleed orifices 14, a passage 16 is defined. Passage 16 is back loaded since it leads to a reaction engine (not shown). While passage 17 has been shown not to have a throat section, in certain applications it may be preferable to have passage 17 convergent and divergent as passage 18 is.

Operation

In normal operation, ram air will enter passage 18 and a shock wave 20 will be, as shown in the figure, slightly downstream of orifices 14. This location of the shock wave will allow maximum compression efficiency. If the shock wave should move upstream towards throat 71, due to a high back pressure in passage 16, a serious loss of compression efficiency will occur along with flow instabilities. Part of the ram air directed to the diffuser will enter passage 17 and flow to atmosphere by passage 15. There will be no shock wave in passage 17 as the passage is not back loaded, as passage 18 is, but merely exhausts to atmosphere. The static pressure differential across orifices 14 is essentially zero when shock wave 20 is downstream of the orifices. Therefore there will be no flow from passage 18 to passage 17 through orifices 14. If the back pressure in passage 16 increased causing shock wave 20 to move upstream to orifices 14 the static pressure differential across orifices 14 will no longer be zero as the pressure in passage 18, adjacent the orifices, will be raised due to the presence of the shock wave. The fluid in passage 18 will be forced through bleed orifices 14 to the low pressure in passage 17 and be vented by passage 15. Since a shock wave seeks a low pressure area the shock wave will not be able to move upstream to throat 71 because the throat will be at a higher pressure than the region in passage 18 adjacent bleed orifices 14.

When the back pressure in passage 16 decreases the shock wave will travel to the region shown in the figure, as this is the low pressure region now, and there will be no flow to passage 17 from passage 18 across orifice 14 for the reasons previously stated.

From the foregoing disclosure and from the drawing, skilled persons will readily understand that the reason why there is normally no flow from passage 18 to passage 17 is as follows. As is obvious, the pressure on the upstream side of shock wave 20 is greater than atmospheric. The portion of passage 17 having the increased cross-sectional area 50 causes the pressure in that region of passage 17 to rise and to therefore also be greater than atmospheric. It will also be readily understood that, by suitable dimensioning of passage 17, the pressure rise in the downstream region of that passage can be optimized to equal the pressure that exists on the passage 18 side of the orifices 14 under desired normal operating conditions.

It can thus be seen that I have provided novel means to control the position of a shock wave in a diffuser without utilizing moving mechanical parts overcoming some of the deficiencies of the prior art. It will also be apparent to those skilled in the art that the system I have provided for controlling the position of a shock wave within a diffuser will have unlimited life and no maintenance problems due to the lack of moving mechanical parts.

Without further analysis, the foregoing will so fully reveal the gist of the present invention that others can by applying current knowledge readily adapt it for various applications without omitting features that, from the standpoint of prior art, fairly constitute essential characteristics of the specific aspects of this invention and, therefore, such adaptions should and are intended to be comprehended within the meaning and range of equivalents of the following claims.

I claim:
1. In a supersonic aerodynamic diffuser of the type having bleed orifices upstream from the normal position of the shock wave, an improved structure for preventing flow through said orifices under normal operating conditions, said structure comprising: an aerodynamic device, having no moving parts, for producing an above-atmospheric pressure in the region immediately external to said orifices, said pressure corresponding to the above-atmospheric pressure existing inside the diffuser in the region of said orifices under normal operating conditions.

2. The invention according to claim 1 wherein said aerodynamic device comprises a secondary passage external to, and generally parallel to, the main passage of said diffuser, said orifices communicating from said main passage to said secondary passage, said secondary passage having an increased cross-sectional area in the region of said orifices.

3. The invention according to claim 2 wherein said diffuser comprises:
(a) a center body,
(b) a first cowl surrounding said center body and defining the main passage of said diffuser between said first cowl and said center body, and
(c) a second cowl surrounding said first cowl and defining said secondary passage between said first cowl and said second cowl.

References Cited

UNITED STATES PATENTS

| | | | |
|---|---|---|---|
| 2,920,446 | 1/1960 | Ranard | 137—15.2 |
| 2,931,167 | 4/1960 | Leduc | 137—15.1 |
| 2,966,028 | 12/1960 | Johnson et al. | 137—15.1 |
| 3,023,571 | 3/1962 | Pietrangeli et al. | 137—15.1 |

OTHER REFERENCES

National Advisory Committee for Aeronautics; technical note No. 3767; published September 1956 by John C. Evvard and John W. Blakey; pages 3 and 18.

ROBERT G. NILSON, Primary Examiner